(12) United States Patent
Durham et al.

(10) Patent No.: US 6,507,929 B1
(45) Date of Patent: *Jan. 14, 2003

(54) SYSTEM AND METHOD FOR DIAGNOSING AND REPAIRING ERRORS IN COMPLEMENTARY LOGIC

(75) Inventors: Christopher McCall Durham, Austin, TX (US); Peter Juergen Klim, Austin, TX (US); Ronald Gene Walther, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/270,468

(22) Filed: Mar. 15, 1999

(51) Int. Cl.[7] .................................................. H04L 1/08
(52) U.S. Cl. ...................... 714/823; 326/121; 326/129
(58) Field of Search ................................ 365/200–201, 365/230.05; 714/823, 746, 724; 326/121, 129

(56) References Cited

U.S. PATENT DOCUMENTS

| | | | | |
|---|---|---|---|---|
| 4,694,274 A | * | 9/1987 | Shimada et al. | 340/146.2 |
| 5,450,020 A | * | 9/1995 | Jones et al. | 326/31 |
| 5,633,820 A | * | 5/1997 | Beakes et al. | 708/682 |
| 5,777,491 A | * | 7/1998 | Hwang et al. | 326/113 |
| 6,043,696 A | * | 3/2000 | Klass et al. | 326/95 |
| 6,046,608 A | * | 4/2000 | Theogarajan | 326/112 |
| 6,253,350 B1 | * | 6/2001 | Durham et al. | 326/121 |

OTHER PUBLICATIONS

U.S. patent application Ser. No. 09/270,182, Durham et al., filed Mar. 15, 1999.

* cited by examiner

Primary Examiner—Albert Decady
Assistant Examiner—Guy Lamarre
(74) Attorney, Agent, or Firm—Casimer K. Salys; Bracewell & Patterson, L.L.P.

(57) ABSTRACT

A system within a complementary logic circuit having a true tree and a complement tree, for correcting an illegal non-complementary output caused by a defect in either tree. A complementary logic circuit has a true tree for producing a true signal and a complement tree for producing a complement signal. The true signal is utilized to generate a true output signal from the complementary logic circuit and the complement signal is utilized to generate a complement output signal from the complementary logic circuit. Multiplexing means within the true and complement trees are utilized to selectively replace the true (complement) signal with the complement (true) signal within the true (complement) tree, such that the complement (true) tree is utilized to correct the occurrence of a proscribed non-complementary condition at the output of the complementary logic circuit to diagnose a defect during diagnostic testing or to override a defect during normal runtime operation.

16 Claims, 12 Drawing Sheets

SYSTEM AND METHOD FOR DIAGNOSING AND REPAIRING ERRORS IN COMPLEMENTARY LOGIC

CROSS REFERENCE TO RELATED APPLICATIONS

The present application is related to the following copending U.S. Patent Applications: U.S. patent application Ser. No. 09270182 filed on mar. 15, 1999, titled "Complementary Logic Error Detection and Correction". The above mentioned patent application is assigned to the assignee of the present invention. The content of the cross referenced copending applications are hereby incorporated herein by reference thereto.

TECHNICAL FIELD

The present invention relates in general to diagnosing and debugging complementary logic circuit designs, and in particular to a system and method for ensuring that a complementary condition is maintained at the output of a complementary logic circuit. Still more particularly, the present invention relates to a system and method that correct an illegal non-complementary condition at the output of a complementary logic circuit, thereby avoiding the unpredictability and uncertainty that result from a non-complementary output, thus rendering the defective circuit fully functional.

DESCRIPTION OF THE RELATED ART

As electronic circuit geometries decrease, testing for manufacturing defects becomes increasingly difficult. Many defects can be detected during manufacturing tests. However, some defects, such as resistive shorts between nets, resistive open contacts or excessive transistor leakage, cause only subtle effects that may not cause logical failure during an initial manufacturing test, but will cause failures at a later time. Quiescent power supply current (IDDq) testing has been utilized in the past to detect some of these subtle defects, but in deep sub-micron technologies, normal leakage currents are sufficiently high that it is becoming impossible to detect and identify small amounts of extra current caused by a defect.

Burn-in testing has been utilized in the past to accelerate early-life failures, but today's deep sub-micron technologies are less capable of tolerating the high voltage and temperature conditions utilized in burn-in testing. These trends mean that electronic circuit initial quality and long-term reliability are becoming more difficult to assure, thus forming a need for improved methods of defect detection and error correction to improve initial quality, and to make circuits more fault tolerant in operation.

As processor speeds climb, circuit designers are challenged to achieve higher circuit speeds to accommodate the demand. Techniques such as dynamic logic are suitable for such applications, but are susceptible to performance degradation due to subtle design and manufacturing defects such as noise coupling, charge sharing, and high leakage. Furthermore, debugging dynamic logic is a complex and costly task. Consequently, fast static logic families are becoming more prevalent in the industry today to counteract the difficult design issues that arise in dynamic logic. Also, with the advent of Silicon-On-Insulator (SOI) technologies, with its relatively low capacitive loading and the ability to increase the number of devices in series ("stack height"), static pass-gate logic is becoming very competitive with dynamic logic in circuit speed. In previous BULK CMOS technologies, the traditional limit on series N-type MOSFETs, commonly referred to in the art as "nfets", (the combination of transistors I1 and I3 or I1 and I4 of FIG. 1) has been two to three. However, in the newer SOI technologies, the limit on series nfets is climbing rapidly, and has already exceeded six. This trend is made possible by two advantageous characteristics of SOI technology: the device threshold dependency on the source-body voltage is removed; and the device diffusion capacitance is lowered by more than 66%.

Many of the fast static pass-gate logic families that are being utilized are complementary in nature, meaning that they produce both true and complement output signals, and circuit input signals are provided in both true and complement form. Examples of such families are Double Pass-transistor Logic (DPL), Differential Cascode Voltage Switch with Pass-Gate (DCVSPG), Complementary Pass-Transistor Logic (CPL), etc.

CPL circuits may be further categorized as belonging to one of two sub-classes: standard and cross-coupled. FIG. 1A depicts a prior art three way XOR/XNOR standard CPL circuit 100, while FIG. 1B illustrates a sample three way XOR/XNOR cross-coupled CPL circuit 150. Note in FIG. 1A that standard CPL circuit 100 utilizes small pmos feedback devices 110 and 112 from XOR output 102 and XNOR output 104 to internal node 106 and internal node 108 (TREE_T/TREE_C). Feedback devices 110 and 112 serve to draw the internal nodes 106 and 108 to full rail (up to VDD from VDD-VT). However, note that cross-coupled CPL circuit 150, of FIG. 1B, utilizes similar pmos devices 110 and 112, connected to complementary internal nodes 106 and 108 (TREE_T/TREE_C), which serve not only to draw the internal nodes full-rail but also increases circuit performance.

Note that in complementary logic circuits 100 and 150 of FIGS. 1A and 1B, input signals A 114 and A_ 116 are logical complements of each other, as are signal pairs B/B_ and $C/C_{13}$. CPL, DCVSPG, and DPL circuits operate differentially. That is, when the input signals force one output high, the associated complementary output is forced low.

However, when a defect occurs in manufacturing or if a defect appears during circuit use, these outputs may no longer be complementary. When this happens, the circuits downstream of this defective circuit no longer see complementary input signals. These "illegal" input states can cause floating nodes (high-impedance, Z state) or value contention (1 and 0 driving onto a net simultaneously, for example) which will produce unpredictable circuit behavior. Thus, such a defect may not be detected during manufacturing testing. For example, if the A/A_ input signals in FIG. 1B are simultaneously at a non-complementary 0/0 state due to a defect in the circuit producing signals $A/A_{13}$, nets TREE_T and TREE_C may be floating (undriven, high impedance) except for cross-coupled pfet devices 110 and 112. The values that will emerge at nodes 106 and 108 are unpredictable, thus making XOR output 102 and XNOR output 104 unpredictable. Likewise, if input signals A/A_ are simultaneously at a non-complementary 1/1 state due to a defect, nodes 106 and 108 (TREE_T and TREE_C) will be driven by contending high and low voltage values regardless of the values on the B and C input signals. The resultant voltages on nodes 106 and 108 may be at some value between the high and low voltage states for logic 1 and 0, thus causing complementary XOR/XNOR outputs 102 and 104 to be unpredictable. Most defects that cause an incorrect value at a single output of a complementary pass-gate circuit family will cause unpredictable behavior in downstream circuits, and are thus difficult to detect and identify during testing.

It would therefore be desirable to be able to correct an illegal non-complementary output from a complementary logic circuit during diagnostic testing. Further, it would be desirable to provide a system for selectively decoupling one transistor tree within a complementary logic circuit and utilize the other tree to ensure a complementary condition at the output of a complementary logic circuit. Such a system, if implemented, would be useful by ensuring that a defect in a complementary logic circuit that would normally cause a non-complementary output may be more effectively traced and corrected.

SUMMARY OF THE INVENTION

It is therefore one object of the present invention to provide a system and method for diagnosing and debugging complementary logic circuits.

It is another object of the present invention to provide a system and method for ensuring that a complementary condition is maintained at the output of a complementary logic circuit.

It is yet another object of the present invention to provide a system and method for correcting an illegal non-complementary condition at the output of a complementary logic circuit, thereby avoiding the unpredictability and uncertainty that result from a non-complementary output.

Some or all of the foregoing objects may be achieved in one embodiment of the present invention as is now described. A system within a complementary logic circuit having a true tree and a complement tree, for correcting an illegal non-complementary output caused by a defect in either tree is disclosed. A complementary logic circuit has a true tree for producing a true signal and a complement tree for producing a complement signal. The true signal is utilized to generate a true output signal from the complementary logic circuit and the complement signal is utilized to generate a complement output signal from the complementary logic circuit. Multiplexing means within the true and complement trees are utilized to selectively replace the true (complement) signal with the complement (true) signal within the true (complement) tree, such that the complement (true) tree is utilized to correct the occurrence of a proscribed non-complementary condition the output of the complementary logic circuit to diagnose a defect during diagnostic testing or to override a, defect during normal runtime operation.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

The system and method of the present invention comprises modifying any family of complementary pass-gate circuits, whether in BULK or SOI technologies, such that a proscribed non-complementary condition at that occurs at the output of such a circuit may be overridden. Implementation of such a system and method would be particularly useful during diagnostic testing by providing a means of tracing previously undetectable errors in complementary logic circuits. During diagnostic testing, an incorrect value on one of a complementary pair of outputs caused by a defect in a true or complement transistor tree may be corrected and maintained in a complementary condition. Therefore, in accordance with the teachings of the present invention, a more fault resistant complementary logic circuit is created, such that a defect that would normally cause an invalid 0/0 or 1/1 true/complement output (a non-complementary output), may be more effectively detected.

The present invention may be implemented during circuit testing to provide a means for converting a non-complementary output into a complementary output to aid in diagnosing defects. As a diagnostic tool, the system and method of the present invention allow downstream logic to be driven by complementary signals that do not cause floating nodes or value contention, thus avoiding unpredictable circuit states and allowing the erroneous signals to propagate to observable points for error detection during manufacturing or system testing. In addition, when a defect exists in either the true or complement transistor tree, this circuit modification allows both true and complement output signals to be generated by the defect-free tree, thus allowing the circuit to be repaired for manufacturing yield enhancement, or for defect correction during use.

Figure 2A:
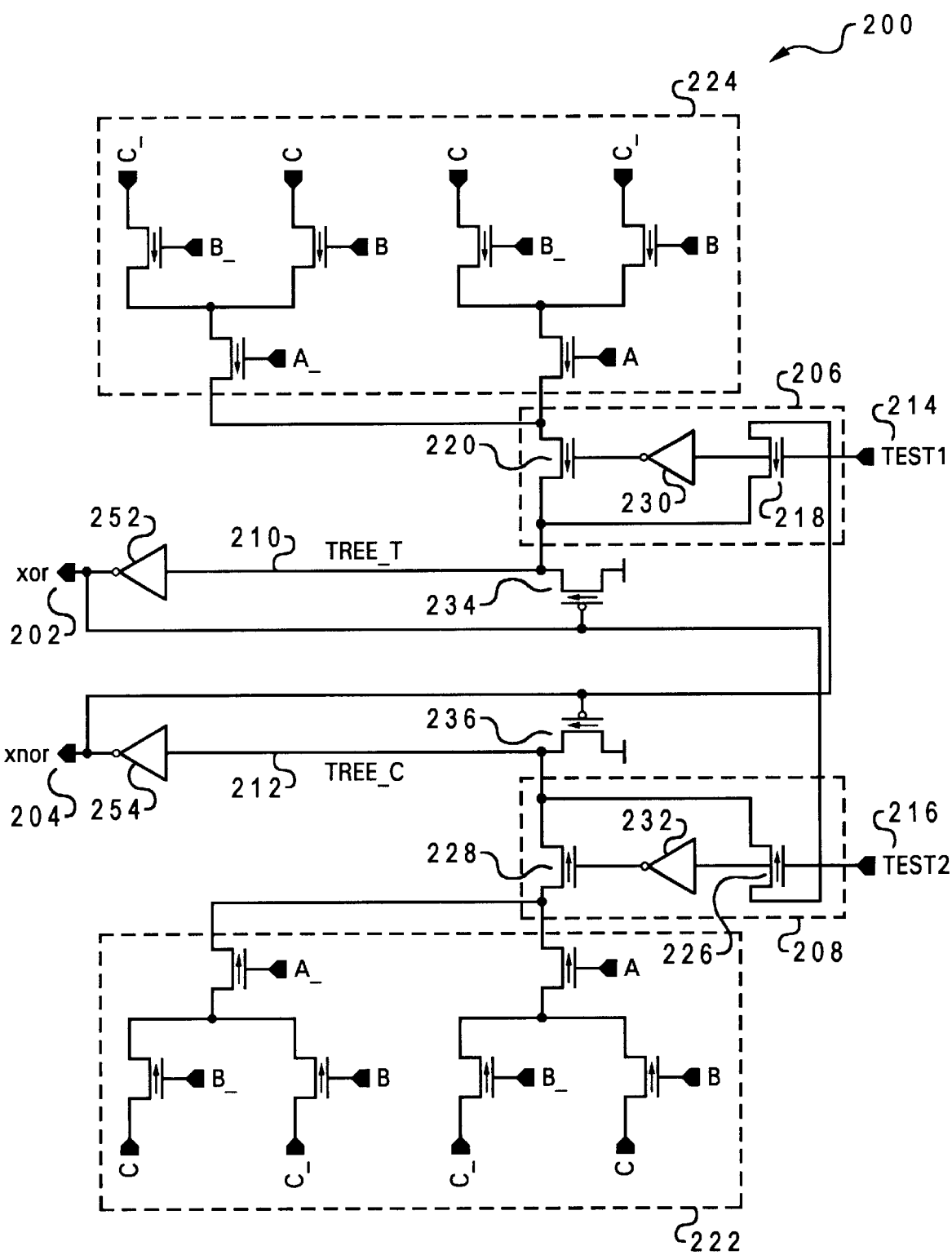
FIG. 2A depicts one embodiment of the system of the present invention in which test signals are utilized to wrap complementary outputs into multiplexing NMOS pass-gate inputs within a standard complementary pass transistor logic circuit.

FIGS. 2A/2B, 3A/3B, 4A/4B and 5A/5B, illustrate four different embodiments of the invention in terms of standard CPL ("A" notations), and cross-coupled CPL ("B" notations). That is, FIGS. 2A, 3A, 4A, and 5A are embodiments for standard CPL circuits 200, 300, 400, and 500, while 2B, 3B, 4B, and 5B are embodiments for cross-coupled CPL circuits 250, 350, 450, and 550. The circuits depicted in FIGS. 2A/2B, 3A/3B, 4A/4B and 5A/5B, share many of the same features which, in the interest of clarity, will be numbered consistently throughout. It should be noted that although FIGS. 2A/2B, 3A/3B, 4A/4B and 5A/5B, illustrate implementation of the present invention within CPL circuits, any other variation or family of complementary logic circuits may be similarly modified without departing from the spirit and scope of the present invention.

Figure 2B:
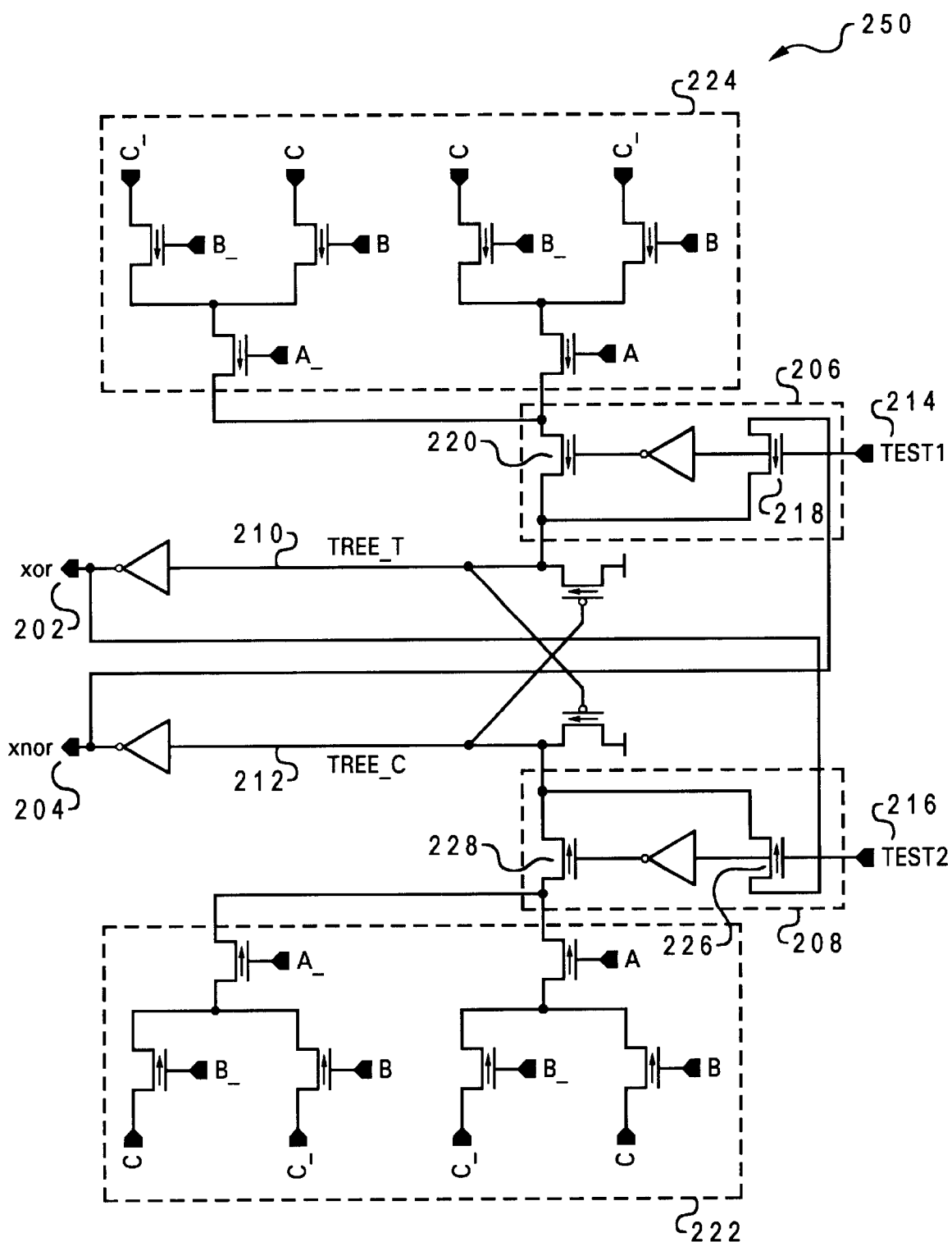
FIG. 2B illustrates the test multiplexing scheme of FIG. 2A applied to a cross-coupled complementary pass transistor logic circuit.

FIGS. 2A and 2B depict one embodiment of the present invention that, in the interest of clarity, will be referred to hereinafter as "Test Mux Type 1a". As seen in FIG. 2A, complementary XOR/XNOR outputs 202 and 204 are wrapped into multiplexing NMOS pass-gates 206 and 208 utilizing select signals TEST1 214 and TEST2 216 respectively.

Figure 3A:
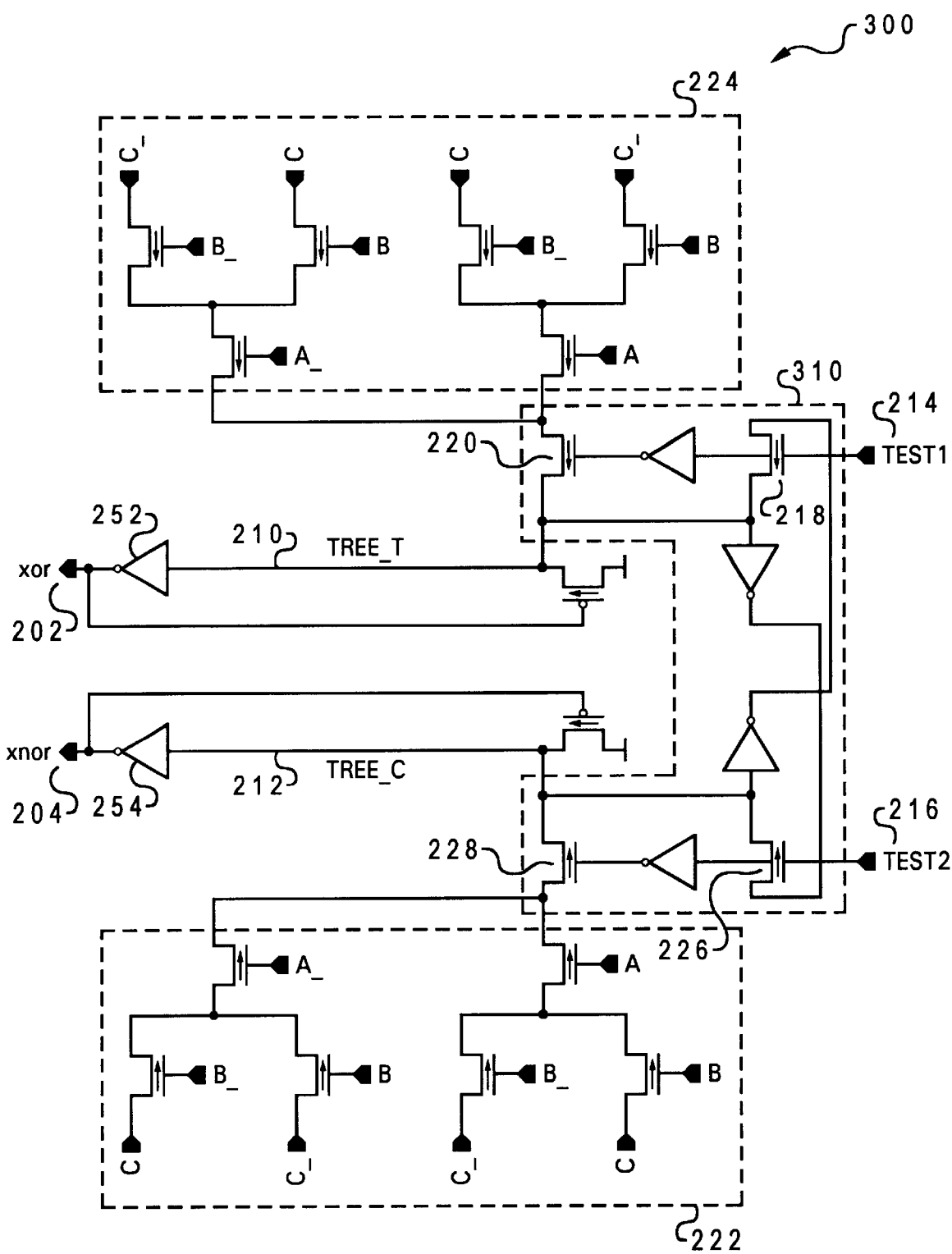
FIG. 3A depicts an alternate embodiment of the present invention in which test signals are utilized to feed internal nodes of a standard complementary pass transistor logic circuit into multiplexing NMOS pass-gate inputs.
Figure 3B:
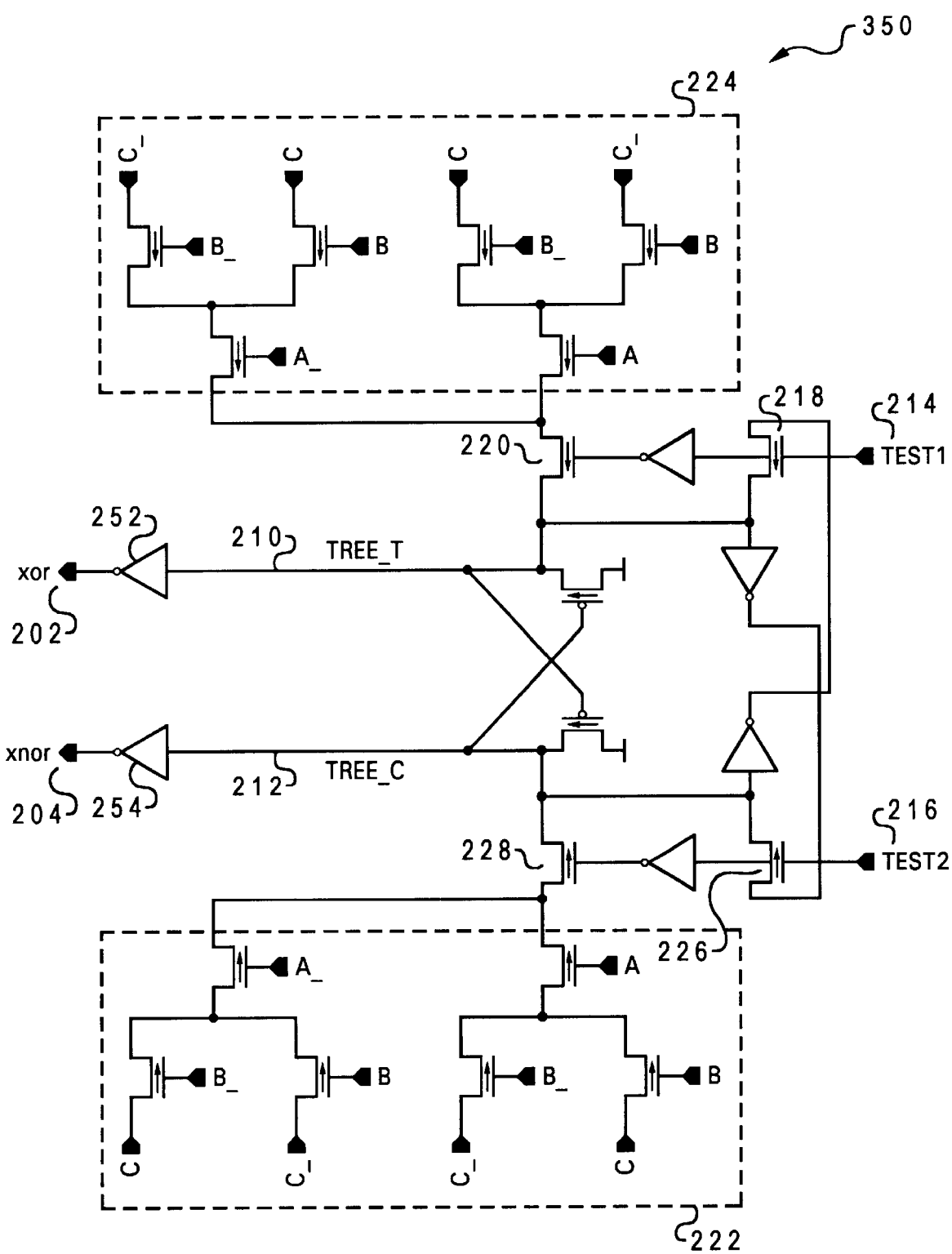
FIG. 3B illustrates the test multiplexing scheme of FIG. 3A applied to a cross-coupled complementary pass transistor logic circuit.

FIGS. 3A and 3B illustrate an alternate embodiment of the present invention referred to hereinafter as "Test Mux Type 1b". In this embodiment, internal nodes TREE_T 210 and TREE_C 212 are fed through inverters into multiplexing NMOS pass-gate inputs utilizing select signals TEST1 214 and TEST2 216.

Figure 4A:
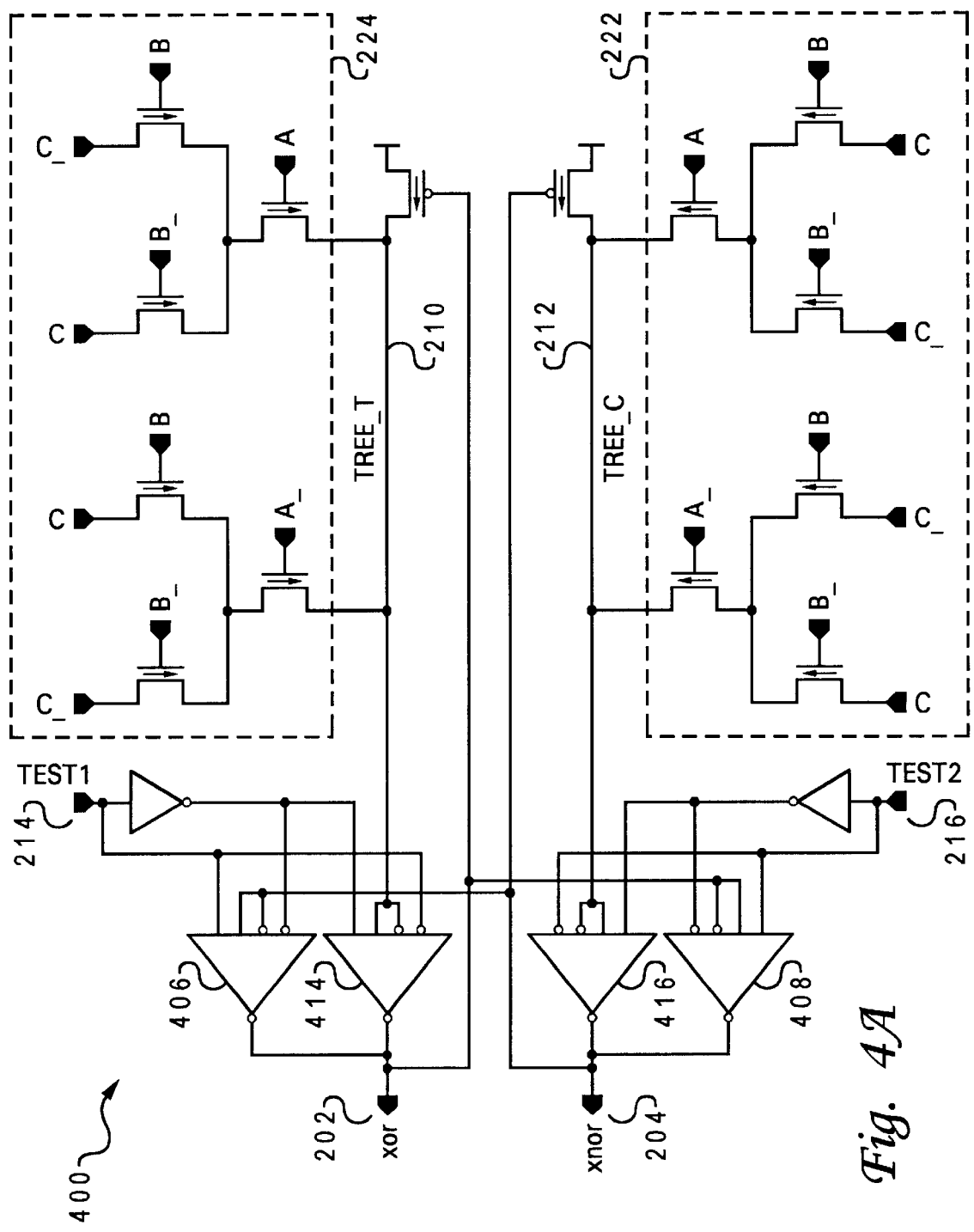
FIG. 4A depicts an alternate embodiment of the present invention in which test signals are utilized to wrap the complementary outputs of a standard complementary pass transistor logic circuit into a set of tristate multiplexing inverters.
Figure 4B:
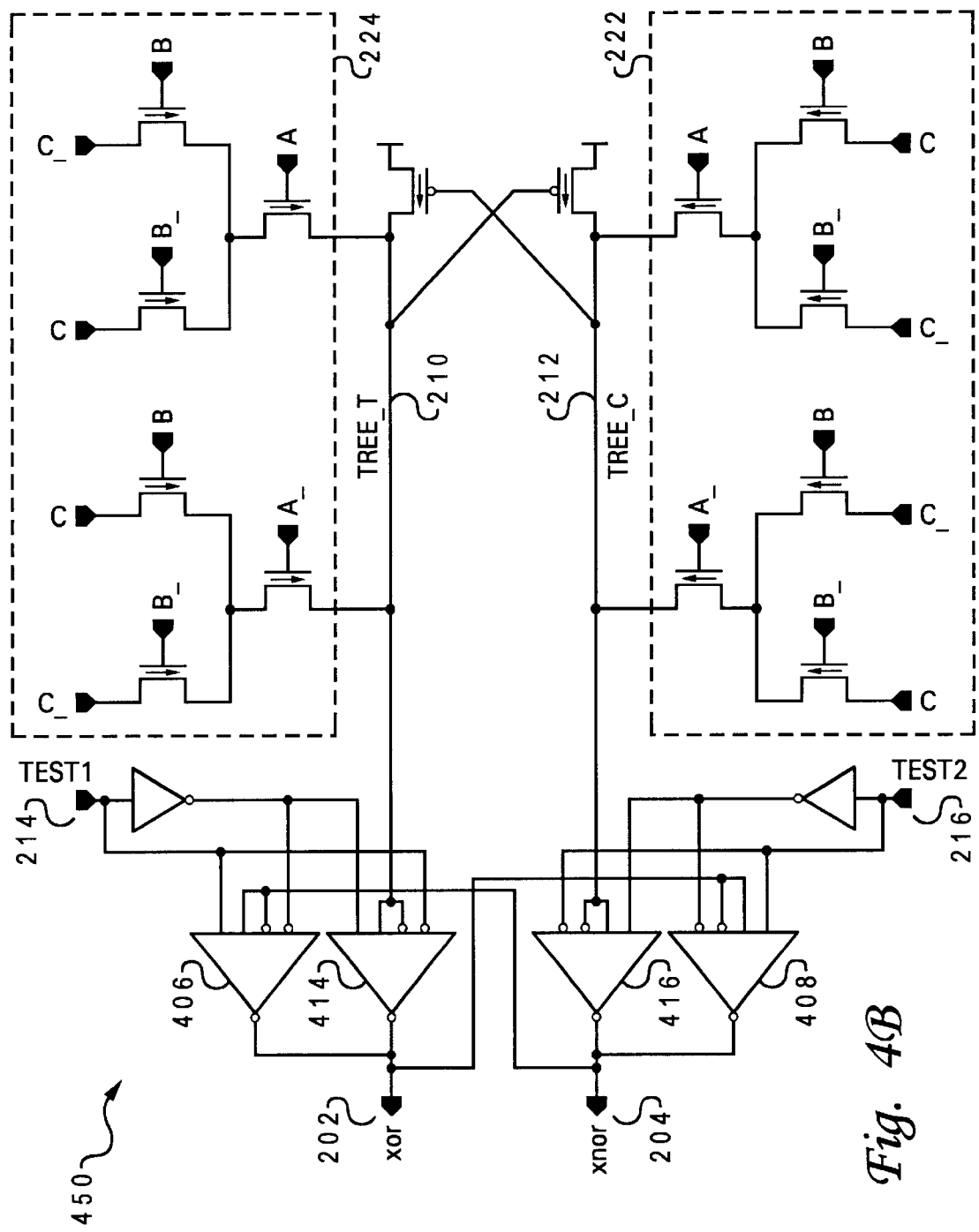
FIG. 4B illustrates the tristate multiplexing scheme of FIG. 4A applied to a cross-coupled complementary pass transistor logic circuit.

FIGS. 4A and 4B depict an alternate embodiment of the present invention referred to hereinafter as "Test Mux Type 2a". In this embodiment, the output inverters 252 and 254, characteristic of CPL circuits illustrated in FIGS. 2A/2B and 3A/3B, are replaced with tristate multiplexing inverters 414 and 416. In parallel, complementary outputs 202 and 204 are wrapped into a second set of tristate multiplexer inverters 406 and 408 utilizing select signals TEST1 214 and TEST2 216.

Figure 5A:
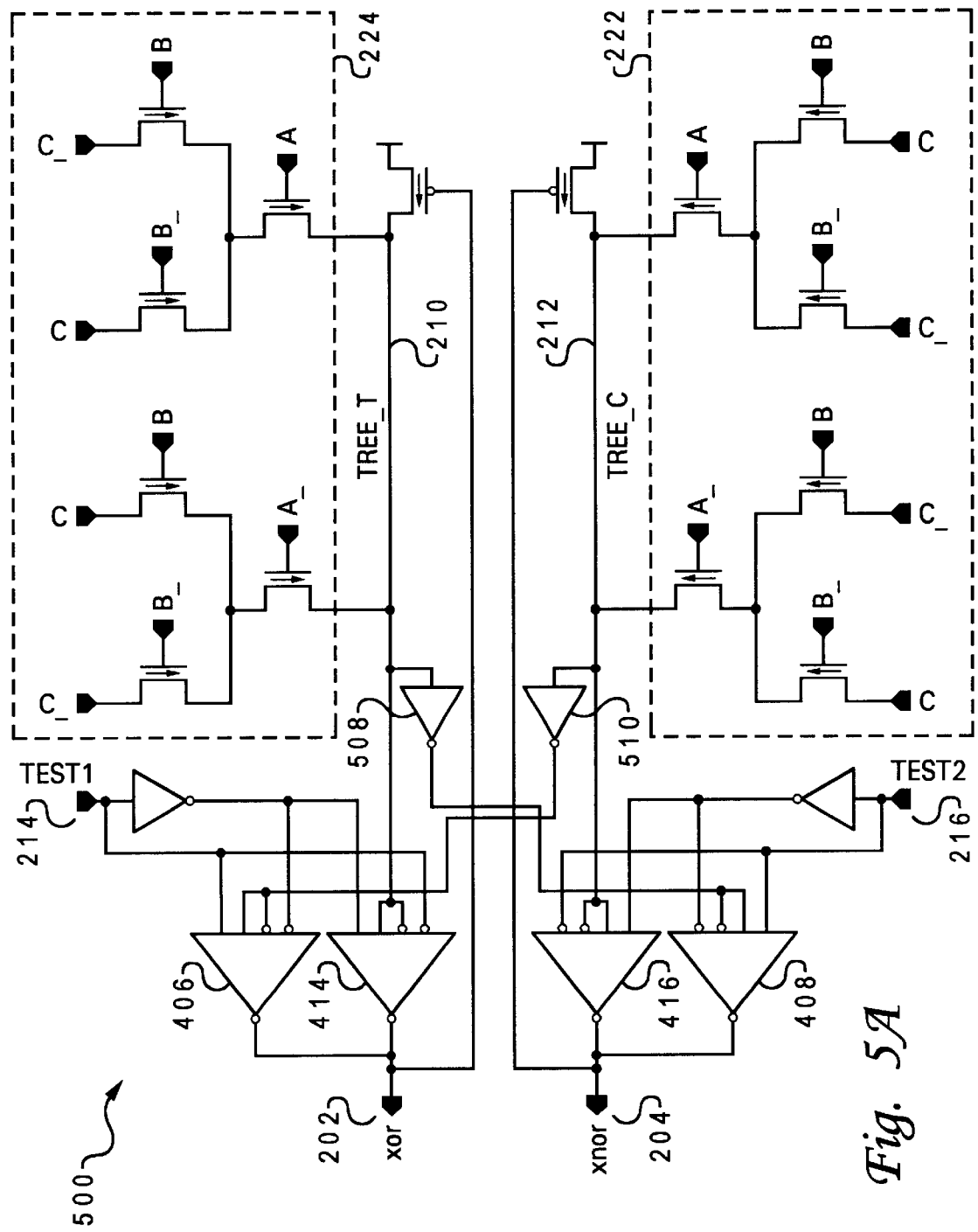
FIG. 5A depicts an alternate embodiment of the present invention in which test signals are utilized to feed internal nodes of a standard complementary pass transistor logic circuit into a set of tristate multiplexing inverters.
Figure 5B:
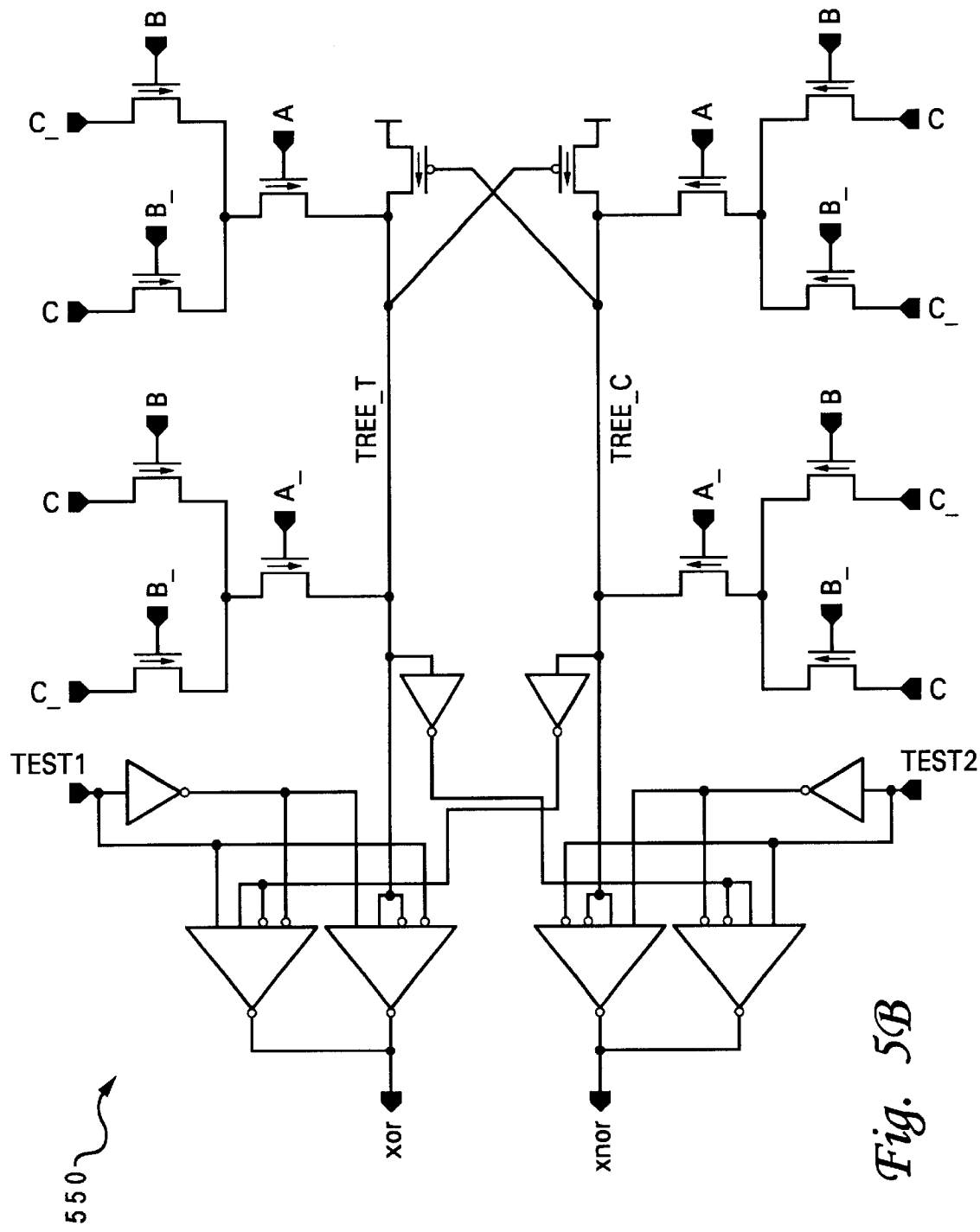
FIG. 5B illustrates the tristate multiplexing scheme of FIG. 5A applied to a cross-coupled complementary pass transistor logic circuit.

FIGS. 5A and 5B illustrate an alternate embodiment of the present invention referred to hereinafter as "Test Mux Type 2b". In this embodiment, the output inverters are again replaced by a pair of tristate multiplexing inverters 414 and 416. In this embodiment, however, internal nodes TREE_T 210 and TREE_C 212 are fed through inverters 508 and 510, and wrapped into a second set of tristate multiplexer inverters 406 and 408 utilizing select signals TEST1 214 and TEST2 216.

Note that in all embodiments, two new test control input signals, TEST1 214 and TEST2 216 have been added, along with multiplexing circuitry on both true and complement circuit outputs or internal nodes. Each of the multiplexing circuits of FIGS. 2A/2B, 3A/3B, 4A/4B and 5A/5B, have varying effects on the circuit size, speed, and power consumption. Depending on circuit design priorities, these or some alternative implementation of the multiplexing functions of this invention would be chosen.

Figure 6:
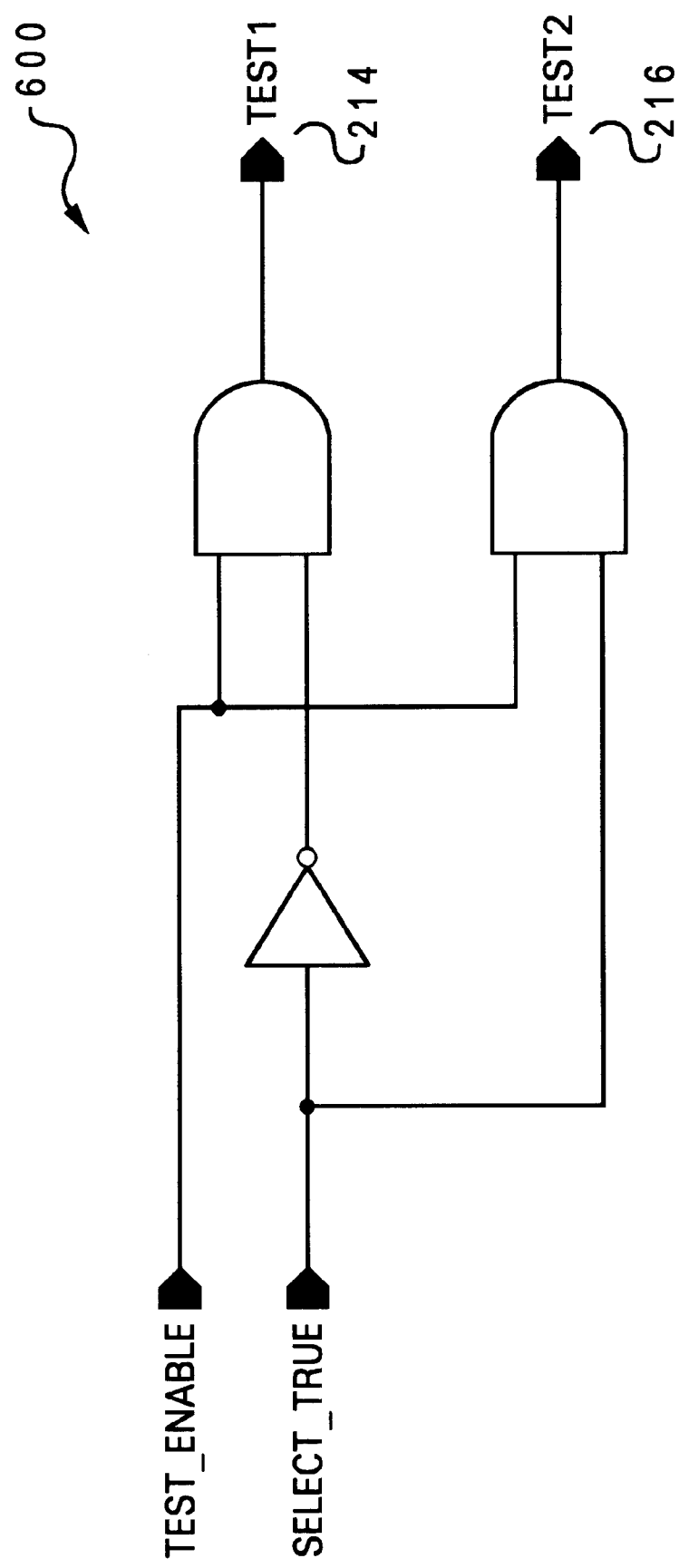
FIG. 6 depicts a test enable circuit configuration for generating test signals that act as select input lines for the muliplexers illustrated in FIGS. 2A, 2B, 3A, 3B, 4A, 4B, 5A, and 5B.

Operation of the circuits of FIG. 2A/2B, 3A/3B, 4A/4B and 5A/5B, occurs by controlling external TEST1 214 and TEST2 216 input select signals. When inputs TEST1 214 and TEST2 216 are both set to logical 0, the circuits of FIGS. 2A/2B, 3A/3B, 4A/4B and 5A/5B, operate normally, logically identically to the circuit of FIGS. 1A and 1B. Note, however, that if inputs TEST1 214 and TEST2 216 are both set to logical 1, the circuits of FIGS. 2A/2B, 3A/3B, 4A/4B and 5A/5B, would be rendered non-functional. Thus, this state of signals TEST1 214 and TEST2 216 is never utilized during diagnostic testing or other circuit use. Consequently, FIG. 6 illustrates an example test enable circuit 600 that may be utilized to generate TEST1 214 and TEST2 216 without allowing both to be set to logical 1 simultaneously.

To illustrate an exemplary test mode of operation in accordance with the teachings of the present invention, consider CPL circuit 200 of FIG. 2A. When input TEST1 214 is set to a logical 1 and TEST2 216 is simultaneously set to a logical 0, "XOR" output 202 receives its value from "XNOR" output 204 via nmos pass-transistor 218 instead of from a standard true side nmos pass-transistor 220. Note that if there is a defect in complement transistor tree 222, both "XNOR" output 202 and "XNOR" output 204 will produce incorrect values. Also, note that if there is a defect only in true transistor tree 224, both "XOR" output 202 and "XNOR" output 204 will produce correct values.

Similarly, when input TEST1 214 is set to a logical 0 and TEST2 216 is set to a logical 1, "XNOR" output 204 receives its value from "XOR" output 202 via nmos pass-transistor 226 instead of from a standard complement side nmos pass-transistor 228. Note that if there is a defect in true transistor tree 224, both "XOR" output 202 and "XNOR" output 204 will produce incorrect values. Also, note that if there is a defect only in complement transistor tree 222, both "XOR" output 202 and "XNOR" output 204 will produce correct values.

All the other embodiments of the present invention depicted in FIGS. 3A/3B, 4A/4B and 5A/5B, operate in a similar fashion.

On a chip-wide basis, test select signals, such as TEST1 214 and TEST2 216, that are supplied to each complementary logic circuit may be generated and distributed to individual sub-circuits in a variety of ways, depending on the objectives of a particular design implementation.

For example, if a primary objective is to ensure the ability to detect defects that cause errors in either true or complement transistor trees, these test select signals may be generated from a single external source and distributed as a global test signal applied uniformly to all complementary logic circuits. This diagnostic method would allow detecting and discarding any die with defects in either true or complement logic trees. In the alternative, this method would allow repairing single or multiple defects that affect only true transistor trees or only complement transistor trees.

On the other hand, if the objective is to significantly improve manufacturing yield or to significantly enhance system error correction, separate TEST1 and TEST2 select signals may be generated for each circuit, macro, or unit, depending on the degree of repairability desired. In this way, multiple defects that occur in only one logic tree within the domain of an individually generated and distributed pair of test select signals, but that may affect both true and complement logic trees, may be detected and corrected.

Figure 1A:
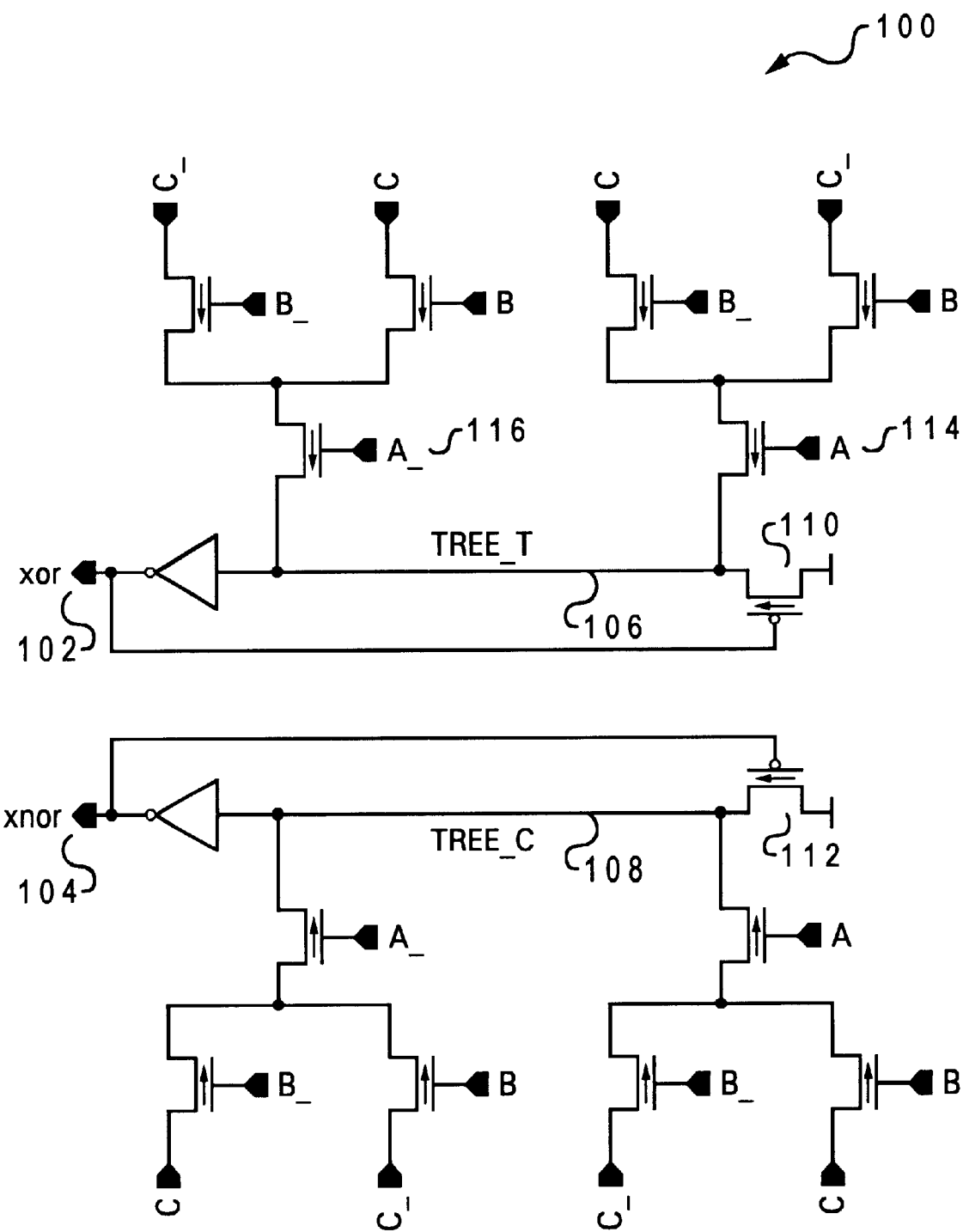
FIG. 1A is an electrical diagram of a prior art three-way XOR/XNOR standard complementary pass transistor logic circuit.
Figure 1B:
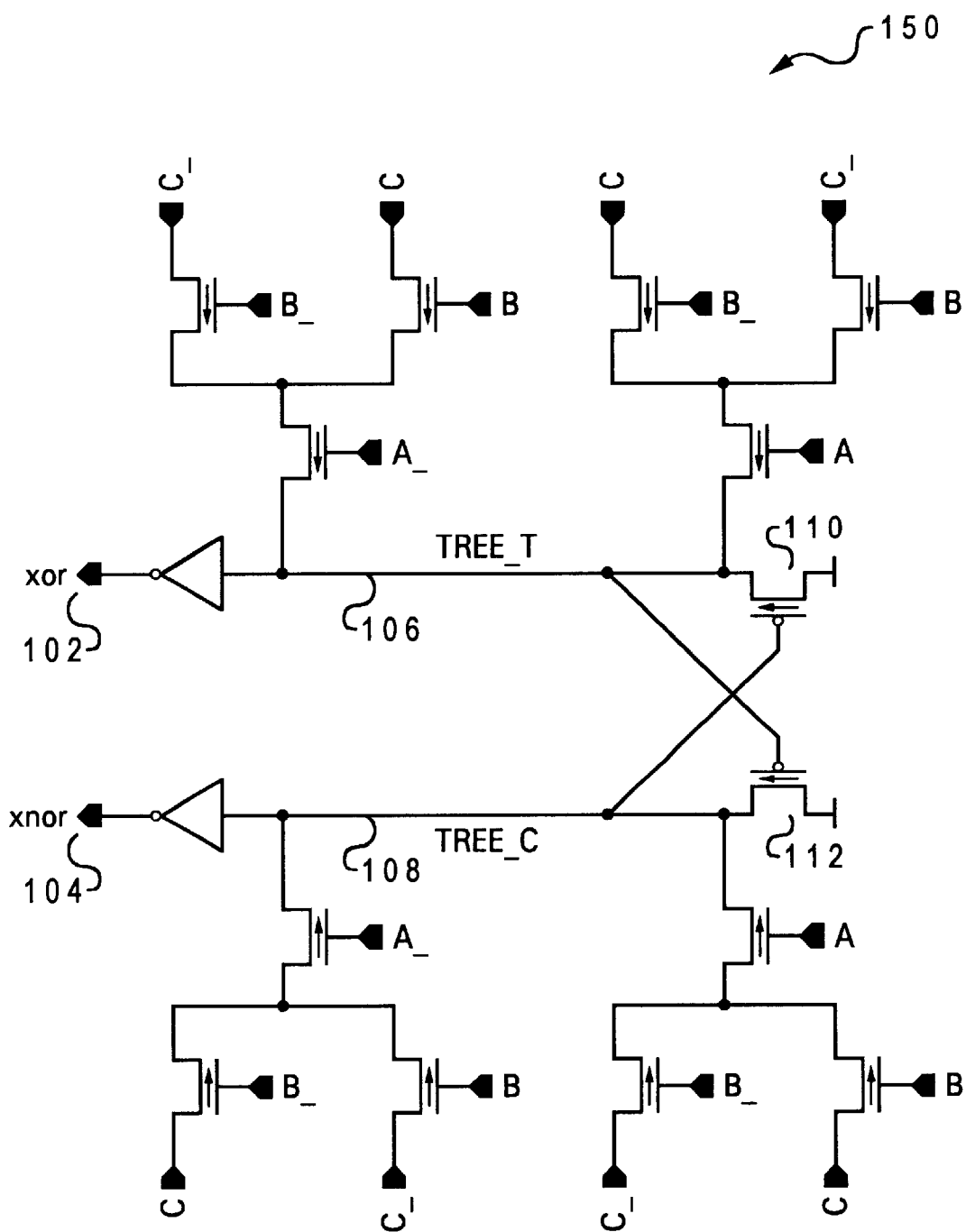
FIG. 1B is an electrical diagram of a prior art three-way XOR/XNOR cross-coupled complementary pass transistor logic circuit.
Figure 7:
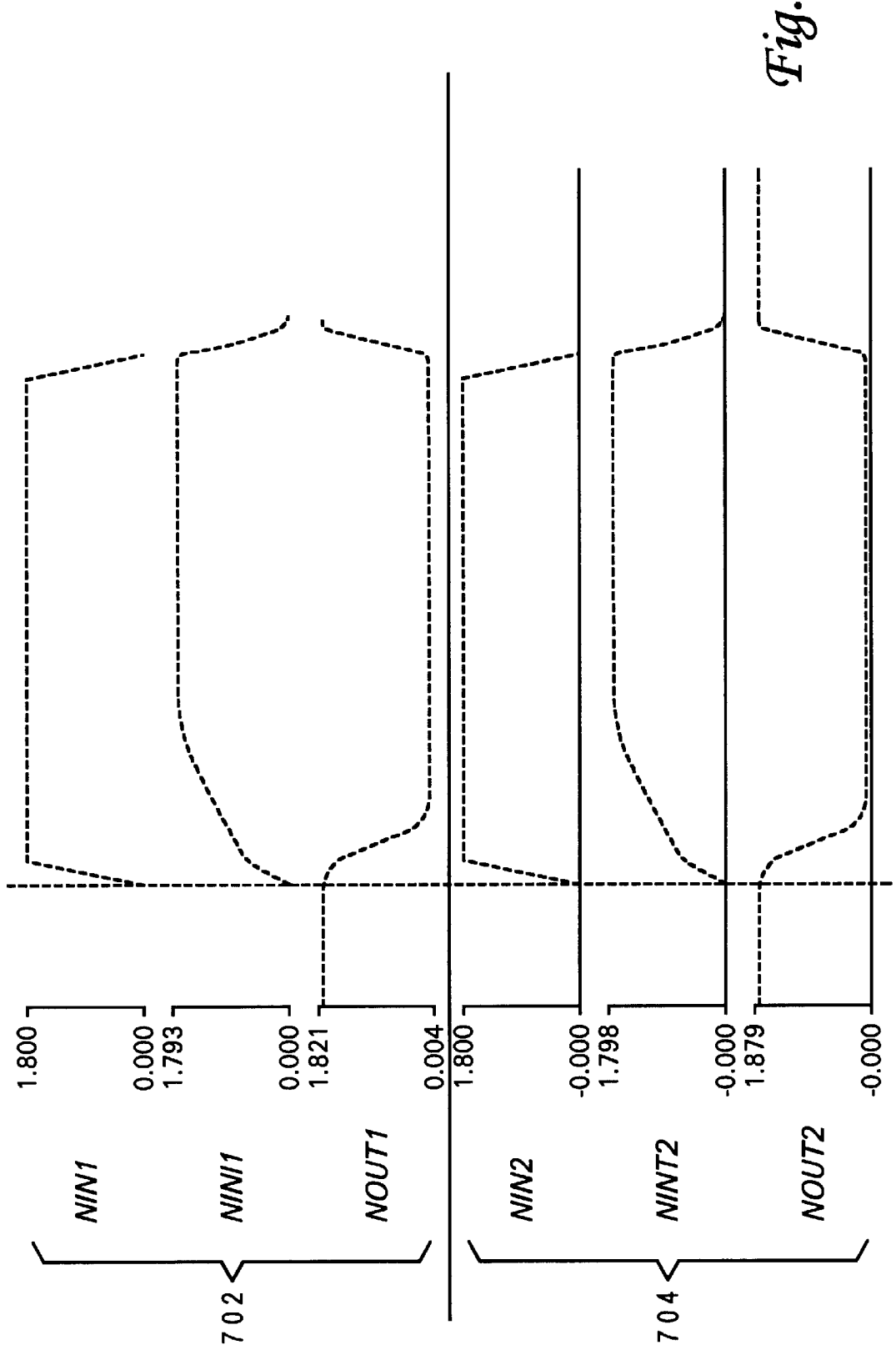
FIG. 7 is a graphical representation of the output voltage as a function of time for FIGS. 1B and 2B, illustrating the effect on circuit performance caused by implementation of the system and method of the present invention on a cross-coupled complementary pass transistor logic circuit.

The insertion of the multiplexing functions illustrated in FIGS. 2A/2B, 3A/3B, 4A/4B and 5A/5B, into the functional paths of FIGS. 1A/1B may have an impact on overall circuit performance. For example, by inserting nmos device 220 of FIGS. 2A/2B and 3A/3B into the functional path of CPL circuits 100 and 150 depicted in FIGS. 1A and 1B, the circuit performance may be reduced because the height of the evaluation stack is increased by 1. To illustrate this degradation, consider the simulation results illustrated in FIG. 7. As seen in FIG. 7, signal set 702 corresponds to an output response of cross-coupled CPL circuit 150 of FIG. 1B. Signal set 704 corresponds to an output response of modified cross-coupled CPL circuit 250 of FIG. 2B. A comparison of simulation results illustrated in signal sets 702 and 704, demonstrate that the insertion of nmos device 220 results in the following performance degradation in terms of delay: C rising to OUT (XOR) falling: 22 ps out of 126 ps, or 17%; and, C falling to OUT (XOR) rising: 9 ps out of 105 ps, or 8.5%. The average of both results in a penalty of less than 13%.

It should be noted that the multiplexing schemes illustrated in FIGS. 4A/4B and 5A/5B will have a slightly lower performance impact than those depicted in FIGS. 2A/2B and 3A/3B. That is, instead of inserting an additional nmos pass-device into the evaluation stack, an extra device set (nmos and pmos) to the supply rails (GND and VDD) has been added in the output inverter to create a tristate mux/inverter. Simulation results demonstrate that a penalty of approximately 10% will result.

However, in terms of area, the cost of the test controlling circuitry may optionally be minimized. That is, for the embodiment illustrated in FIG. 2A/2B (Test Mux Type 1a), the addition of inverters 230 and 232 and nmos devices 220, 228, 218, and 226 the additional die area required is quite small: inverters 230/232 are of minimum feature size as they are non-functional; nmos devices 220 and 228 are the same size as the regular evaluation nmos devices within true tree 224 and complement tree 222; nmos devices 218 and 226 are only of sufficient size (typically small) to provide a DC-solution pull-down of the internal nodes TREE_T 210 and TREE_C 212, while pulling against (weak) pmos devices 234 and 236.

In a preferred embodiment of the present invention, the net result is that the added test functionality and control that the modified CPL circuits of FIGS. 2A/2B, 3A/3B, 4A/4B and 5A/5B provide, greatly improves the testability of the complementary pass-transistor circuit family at a low cost in terms of area and performance. Thus, an enhanced test control/diagnostic and repair system and method are gained.

While the invention has been particularly shown and described with reference to a preferred embodiment, it will be understood by those skilled in the art that various changes in form and detail may be made therein without departing from the spirit and scope of the invention.

What is claimed is:

1. A system for correcting a proscribed non-complementary output from a complementary logic circuit comprising:
   a complementary logic circuit having a true tree and a complement tree, said true tree producing a true signal utilized to generate a true output signal from said complementary logic circuit, said complement tree producing a complement signal utilized to generate a complement output signal from said complementary logic circuit; and
   multiplexing means within said true tree for selectively replacing said true signal with said complement signal within said true tree, such that said complement tree may be utilized to rectify a non-complementary condition at the output of said complementary logic circuit.

2. The system of claim 1 wherein said complementary logic circuit is a CMOS configuration.

3. The system of claim 2 wherein said CMOS configuration may be characterized as among a group consisting of: complementary pass transistor logic, double pass transistor logic, and differential cascode voltage switch with pass gate.

4. The system of claim 2 wherein said CMOS configuration is a standard complementary pass transistor logic configuration.

5. The system of claim 2 wherein said CMOS configuration is a cross-coupled complementary pass transistor logic configuration.

6. The system of claim 2 wherein said true tree and said complement tree are comprised of n N-type pass MOSFETs, where n is a number greater or equal to one.

7. The system of claim 1 wherein said complementary logic circuit is constructed utilizing silicon on insulator technology.

8. The system of claim 1 further comprising multiplexing means within said complement tree for selectively replacing said complement signal with said true signal within said complement tree, such that said true tree may be utilized to rectify a non-complementary logic condition at the output of said complementary logic circuit.

9. The system of claim 8 wherein said multiplexing means includes a true input select signal and a complement input select signal.

10. The system of claim 9 wherein said true input select signal is utilized for selectively replacing said true signal with said complement signal and said complement input select signal is utilized for selectively replacing said complement signal with said true signal.

11. The system of claim 10 wherein said multiplexing means is comprised of a first and a second tristate inverter, said first tristate inverter receiving at least one input control signal from said true input select signal, said second tristate inverter receiving at least one input control signal from said complement input select signal.

12. The system of claim 10 further comprising a test enable circuit for ensuring that said true input select signal and said complement input select signal are not simultaneously enabled.

13. A method for correcting a proscribed non-complementary output from a complementary logic circuit having a true tree and a complement tree, said method comprising the steps of:
   generating a true signal utilizing said true tree, said true signal utilized to produce a true output signal from said complementary logic circuit, and generating a complement signal utilizing said complement tree, said complement signal utilized to produce a complement output signal from said complementary logic circuit; and
   selectively replacing said true signal with said complement signal within said true tree, such that said complement tree may be utilized to rectify a non-complementary condition at the output of said complementary logic circuit.

14. The method of claim 13 wherein said step of selectively replacing said true signal with said complement signal comprises multiplexing said complement signal into said true tree.

15. The method of claim 13 further comprising the step of selectively replacing said complement signal with said true signal within said complement tree, such that said true tree may be utilized to rectify a non-complementary condition at the output of said complementary logic circuit.

16. The method of claim 15 wherein said step of selectively replacing said complement signal with said true signal comprises multiplexing said true signal into said complement tree.

* * * * *